United States Patent [19]
Wollrath et al.

[11] Patent Number: 5,832,529
[45] Date of Patent: Nov. 3, 1998

[54] METHODS, APPARATUS, AND PRODUCT FOR DISTRIBUTED GARBAGE COLLECTION

[75] Inventors: Ann M. Wollrath, Groton; James H. Waldo, Dracut; Roger Riggs, Burlington, all of Mass.

[73] Assignee: Sun Microsystems, Inc., Palo Alto, Calif.

[21] Appl. No.: 729,421

[22] Filed: Oct. 11, 1996

[51] Int. Cl.⁶ .................................................. G06F 17/30
[52] U.S. Cl. ........................................ 707/206; 707/201
[58] Field of Search ..................................... 707/206, 201

[56] References Cited

U.S. PATENT DOCUMENTS

| | | | |
|---|---|---|---|
| 5,088,036 | 2/1992 | Ellis et al. ............................. | 707/206 |
| 5,293,614 | 3/1994 | Ferguson et al. ...................... | 707/201 |
| 5,560,003 | 9/1996 | Nilsen et al. .......................... | 707/206 |
| 5,561,785 | 10/1996 | Blandy et al. ......................... | 711/170 |

OTHER PUBLICATIONS

Chung, Kin–Man and Yuen, Herbert, "A'Tiny' Pascal Complier: the P–Code Interpreter," BYTE Publications, Inc., Sep. 1978.

Chung, Kin–Man and Yuen, Herbert, "A 'Tiny' Pascal Compiler: the P–Compiler," BYTE Publications, Inc., Oct. 1978.

Thompson, Ken, "Regular Expression Search Algorithm," Communications of the ACM, vol. II, No. 6, p 149 et seq., Jun. 1968.

Mitchell, James G., Maybury, William, and Sweet, Richard, Mesa Language Manual, Xerox Corporation, no date.

McDaniel, Gene, "An Analysis of a Mesa Instruction Set," Xerox Corporation, May 1982.

Piere, Kenneth A., "A Restrospective on the Dorado, A High–Performane Personal Computer," Xerox Corporation, Aug. 1983.

Pier, Kenneth A., "A Retrospective on the Dorado, A High–Performance Personal Computer," IEEE Conference Proceedings, The 10th Annual International Symposium on Computer Architecture, 1983.

Birrell, Andrew, et al., "Distributed Garbage Collection for Network Objects," Digital Systems Research Center, No. 116, Dec. 15, 1993, pp. 1–18.

Gray, Cary G., et al., "Leases: An Efficient Fault–Tolerant Mechanism for Distributed File Cache Consistency," Computer Science Department, Stanford University, 1989, pp. 202–210.

Hamilton, Marc A., "Java and the Shift to net–Centric Computing," Computer, Aug. 1996, pp. 31–39.

Birrell, Andrew, et al., "Network Objects," Digital Equipment Corp. Systems Research Center Technical Report, 27 (5), Dec. 1993, pp. 217–230.

*Primary Examiner*—Thomas G. Black
*Assistant Examiner*—C. Lewis
*Attorney, Agent, or Firm*—Finnegan, Henderson, Farabow, Garrett & Dunner, L.L.P.

[57] ABSTRACT

In accordance with the present invention a process is provided for allocating and deallocating resources in a distributed processing system having a requester platform and a server platform. The process involves receiving a request from the requestor platform referring to a system resource and specifying a requested lease period, permitting shared access to the system resource for a lease period, sending a return call to the requestor platform advising of the lease period, and deallocating the system resource when the lease period expires.

70 Claims, 8 Drawing Sheets

METHODS, APPARATUS, AND PRODUCT FOR DISTRIBUTED GARBAGE COLLECTION

BACKGROUND OF THE INVENTION

A. Field of the Invention

This invention generally relates to garbage collection for computer systems and, more particularly, to a fault-tolerant distributed garbage collection method for collecting resources bound to or associated with references.

B. Description of the Related Art

Proper resource management is an important aspect to efficient and effective use of computers. In general, resource management involves allocating resources (e.g., memory) in response to requests as well as deallocating resources at appropriate times, for example, when the requesters no longer require the resources. In general, the resources contain data referenced by computational entities (e.g., applications, programs, applets, etc.) executing in the computers.

In practice, when applications executing on computers seek to refer to resources, the computers must first allocate or designate resources so that the applications can properly refer to them. When the applications no longer refer to a resource, the computers can deallocate or reclaim the resource for reuse. In computers each resource has a unique "handle" by which the resource can be referenced. The handle may be implemented in various ways, such as an address, array index, unique value, pointer, etc.

Resource management is relatively simple for a single computer because the events indicating when resources can be reclaimed, such as when applications no longer refer to them or after a power failure, are easy to determine. Resource management for distributed systems connecting multiple computers is more difficult because applications in several different computers may be using the same resource.

Disconnects in distributed systems can lead to the improper and premature reclamation of resources or to the failure to reclaim resources. For example, multiple applications operating on different computers in a distributed system may refer to resources located on other machines. If connections between the computers on which resources are located and the applications referring to those resources are interrupted, then the computers may reclaim the resources prematurely. Alternatively, the computers may maintain the resources in perpetuity, despite the extended period of time that applications failed to access the resources.

These difficulties have led to the development of systems to manage network resources, one of which is known as "distributed garbage collection." That term describes a facility provided by a language or runtime system for distributed systems that automatically manages resources used by an application or group of applications running on different computers in a network.

In general, garbage collection uses the notion that resources can be freed for future use when they are no longer referenced by any part of an application. Distributed garbage collection extends this notion to the realm of distributed computing, reclaiming resources when no application on any computer refers to them.

Distributed garbage collection must maintain integrity between allocated resources and the references to those resources. In other words, the system must not be permitted to deallocate or free a resource when an application running on any computer in the network continues to refer to that resource. This reference-to-resource binding, referred to as "referential integrity," does not guarantee that the reference will always grant access to the resource to which it refers. For example, network failures can make such access impossible. The integrity, however, guarantees that if the reference can be used to gain access to any resource, it will be the same resource to which the reference was first given.

Distributed systems using garbage collection must also reclaim resources no longer being referenced at some time in the finite future. In other words, the system must provide a guarantee against "memory leaks." A memory leak can occur when all applications drop references to a resource, but the system fails to reclaim the resource for reuse because, for example, of an incorrect determination that some application still refers to the resource.

Referential integrity failures and memory leaks often result from disconnections between applications referencing the resources and the garbage collection system managing the allocation and deallocation of those resources. For example, a disconnection in a network connection between an application referring to a resource and a garbage collection system managing that resource may prevent the garbage collection system from determining whether and when to reclaim the resource. Alternatively, the garbage collection system might mistakenly determine that, since an application has not accessed a resource within a predetermined time, it may collect that resource. A number of techniques have been used to improve the distributed garbage collection mechanism by attempting to ensure that such mechanisms maintain referential integrity without memory leaks. One conventional approach uses a form of reference counting, in which a count is maintained of the number of applications referring to each resource. When a resource's count goes to zero, the garbage collection system may reclaim the resource. Such a reference counting scheme only works, however, if the resource is created with a corresponding reference counter. The garbage collection system in this case increments the resource's reference count as additional applications refer to the resource, and decrements the count when an application no longer refers to the resource.

Reference counting schemes, however, especially encounter problems in the face of failures that can occur in distributed systems. Such failures can take the form of a computer or application failure or network failure that prevent the delivery of messages notifying the garbage collection system that a resource is no longer being referenced. If messages go undelivered because of a network disconnect, the garbage collection system does not know when to reclaim the resource.

To prevent such failures, some conventional reference counting schemes include "keep-alive" messages, which are also referred to as "ping back." According to this scheme, applications in the network send messages to the garbage collection system overseeing resources and indicate that the applications can still communicate. These messages prevent the garbage collection system from dropping references to resources. Failure to receive such a "keep-alive" message indicates that the garbage collection system can decrement the reference count for a resource and, thus, when the count reaches zero, the garbage collection system may reclaim the resource. This, however, can still result in the premature reclamation of resources following reference counts reaching zero from a failure to receive "keep-alive" messages because of network failures. This violates the referential integrity requirement.

Another proposed method for resolving referential integrity problems in garbage collection systems is to maintain not only a reference count but also an identifier corresponding to each computational entity referring to a resource. See A. Birrell, et al., "Distributed Garbage Collection for Network Objects," No. 116, digital Systems Research Center, Dec. 15, 1993. This method suffers from the same problems as the reference counting schemes. Further, this method requires the addition of unique identifiers for each computational entity referring to each resource, adding overhead that would unnecessarily increase communication within distributed systems and add storage requirements (i.e., the list of identifiers corresponding to applications referring to each resource).

SUMMARY OF THE INVENTION

In accordance with the present invention, referential integrity is guaranteed without costly memory leaks by leasing resources for a period of time during which the parties in a distributed system, for example, an application holding a reference to a resource and the garbage collection system managing that resource, agree that the resource and a reference to that resource will be guaranteed. At the end of the lease period, the guarantee that the reference to the resource will continue lapses, allowing the garbage collection system to reclaim the resource. Because the application holding the reference to the resource and the garbage collection system managing the resource agree to a finite guaranteed lease period, both can know when the lease and, therefore, the guarantee, expires. This guarantees referential integrity for the duration of a reference lease and avoids the concern of failing to free the resource because of network errors.

In accordance with the present invention, as embodied and broadly described herein, a method for managing resources comprises the steps of receiving a request from a process referring to a resource and specifying a requested lease period, permitting shared access to the resource for a granted lease period, advising the process of the granted lease period, and deallocating the resource when the granted lease period expires. In accordance with another aspect of the present invention, as embodied and broadly described herein, a method for managing resources comprises the steps of requesting from a process access to a resource for a lease period, receiving from the process a granted lease period during which shared access to the resource is permitted, and sending a request to the process for a new lease period upon a determination that the granted lease period is about to expire but access to the resource has not completed.

In accordance with the present invention, as embodied and broadly described herein, an apparatus comprises a receiving module configured to receive a request from a process referring to a resource and specifying a requested lease period, a resource allocator configured to permit shared access to the resource for a granted lease period, an advising module configured to advise the process of the granted lease period, and a resource deallocator configured to deallocate the resource when the granted lease period expires. In accordance with another aspect of the present invention, as embodied and broadly described herein, an apparatus comprises a requesting module configured to request from a process access to a resource for a lease period, a receiving module configured to receive from the process a granted lease period during which shared access to the resource is permitted, and a second sending module configured to send another request to the process for a new lease period upon a determination that the granted lease period is about to expire but access to the resource has not completed.

In accordance with yet another aspect of the present invention, as embodied and broadly described herein, a computer program product comprises a computer usable medium having computable readable code embodied therein for managing resources. The code comprises a receiving module configured to receive a request from a process referring to a resource and specifying a requested lease period, a resource allocator configured to permit shared access to the resource for a granted lease period, an advising module configured to advise of the granted lease period, and a resource deallocator configured to deallocate the resource when the granted lease period expires. In accordance with another aspect of the present invention, as embodied and broadly described herein, a computer program product comprises a computer usable medium having computable readable code embodied therein for managing resources. The code comprises a requesting module configured to request from a process access to a resource for a lease period, a receiving module configured to receive from the process a granted lease period during which the process permits shared access to the resource, and a sending module configured to send another request to the process for a new lease period upon a determination that the granted lease period is about to expire.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

The present invention may be implemented by computers organized in a conventional distributed processing system architecture. The architecture for and procedures to implement this invention, however, are not conventional, because they provide a distributed garbage collection scheme that ensures referential integrity and eliminates memory leaks.

A. Overview

A method invocation (MI) component located in each of the computers in the distributed processing system implements the distributed garbage collection scheme of this invention. The MI component may consist of a number of software modules preferably written in the JAVA™ programming language.

In general, whenever an application in the distributed processing system obtains a reference to a distributed resource, by a name lookup, as a return value to some other call, or another method, and seeks to access the resource, the application makes a call to the resource or to an MI component managing the resource. That MI component, called a managing MI component, keeps track of the number of outstanding references to the resource. When the number of references to a reference is zero, the managing MI component can reclaim the resource. The count of the number of references to a resource is generally called the "reference count" and the call that increments the reference count may be referred to as a "dirty call."

When an application no longer requires a distributed resource, it sends a different call to the resource or the managing MI component. Upon receipt of this call, the managing MI component decrements the reference count for the resource. This call to drop a reference may be referred to as a "clean call."

In accordance with an implementation of the present invention, a dirty call can include a requested time interval, called a lease period, for the reference to the resource. Upon receipt of the dirty call, the managing MI component sends a return call indicating a period for which the lease was granted. The managing MI component thus tracks the lease period for those references as well as the number of outstanding references. Consequently, when the reference count for a resource goes to zero or when the lease period for the resource expires, the managing MI component can reclaim the resource.

B. Procedure

Figure 1:
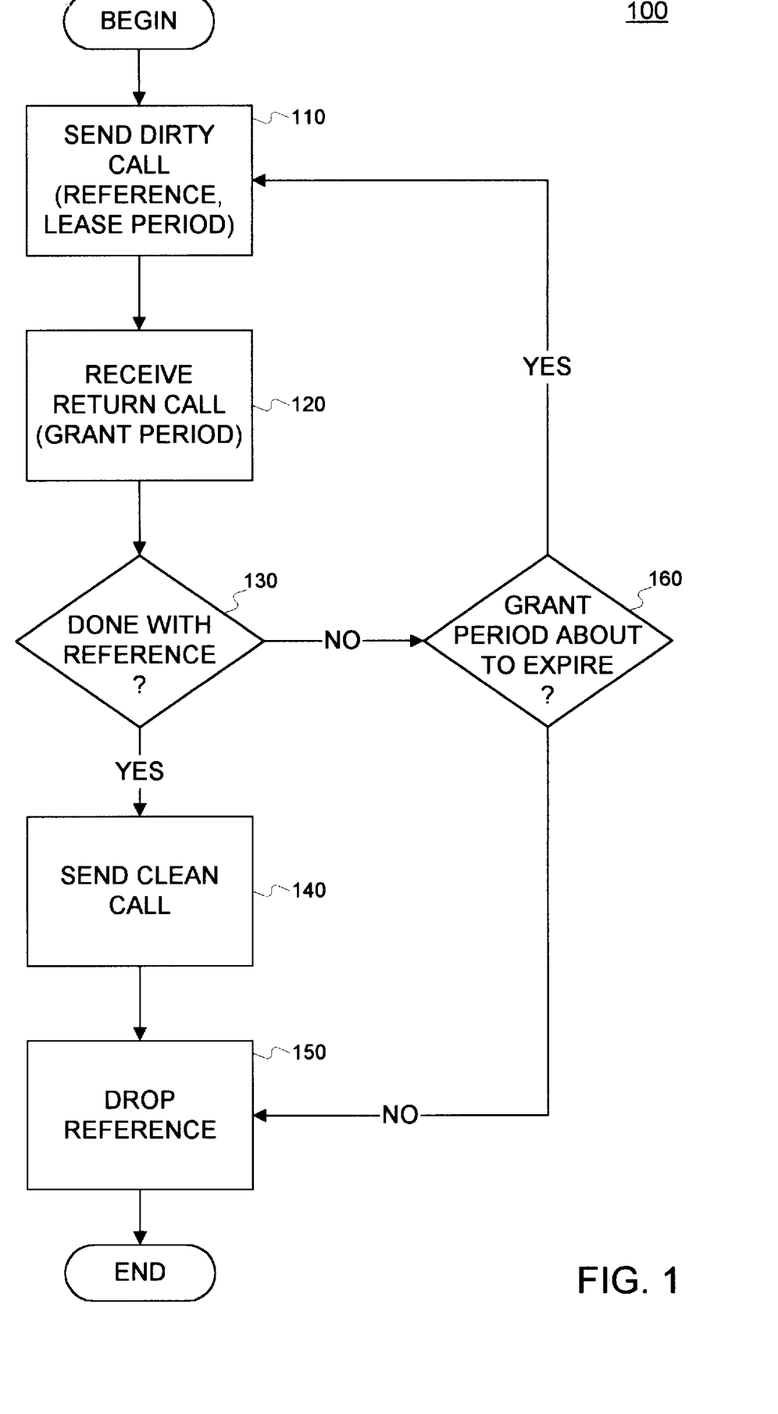
FIG. 1 is a flow diagram of the steps performed by the application call processor according to an implementation of the present invention.

An application call processor in an MI component performs the steps of the application call procedure 100 illustrated in FIG. 1. The server call processor in the managing MI component performs the steps of the procedures 200, 300, and 400 illustrated in FIGS. 2–4, respectively. The managing MI component's garbage collector performs conventional procedures to reclaim resources previously bound to references in accordance with instructions from the server call processor. Accordingly, the conventional procedures of the garbage collector will not be explained.

1. Application Call Processor

FIG. 1 is a flow diagram of the procedure 100 that the application call processor of the MI component uses to handle application requests for references to resources managed by the same or another MI component located in the distributed processing system.

After an application has obtained a reference to a resource, the application call processor sends a dirty call, including the resource's reference and a requested lease period to the managing MI component for the resource (step 110). The dirty call may be directed to the resource itself or to the managing MI component.

The application call processor then waits for and receives a return call from the managing MI component (step 120). The return call includes a granted lease period during which the managing MI component guarantees that the reference of the dirty call will be bound to its resource. In other words, the managing MI component agrees not to collect the resource corresponding to the reference of a dirty call for the grant period. If the managing MI component does not provide a grant period, or rejects the request for a lease, then the application call processor will have to send another dirty call until it receives a grant period.

The application call processor monitors the application's use of the reference and, either when the application explicitly informs the application call processor that the reference is no longer required or when the application call processor makes this determination on its own (step 130), the application call processor sends a clean call to the managing MI component (step 140). In a manner similar to the method used for dirty calls, the clean call may be directed to the referenced resource and the managing MI component will process the clean call. Subsequently, the application call processor eliminates the reference from a list of references being used by the application (step 150).

If the application is not yet done with the reference (step 130), but the application call processor determines that the grant period for the reference is about to expire (step 160), then the application call processor repeats steps 110 and 120 to ensure that the reference to the resource is maintained by the managing MI component on behalf of the application.

2. Server Call Processor

The MI component's server call processor performs three main procedures: (1) handling dirty calls; (2) handling incoming clean calls; and (3) initiating a garbage collection cycle to reclaim resources at the appropriate time.

(i) Dirty Calls

Figure 2:
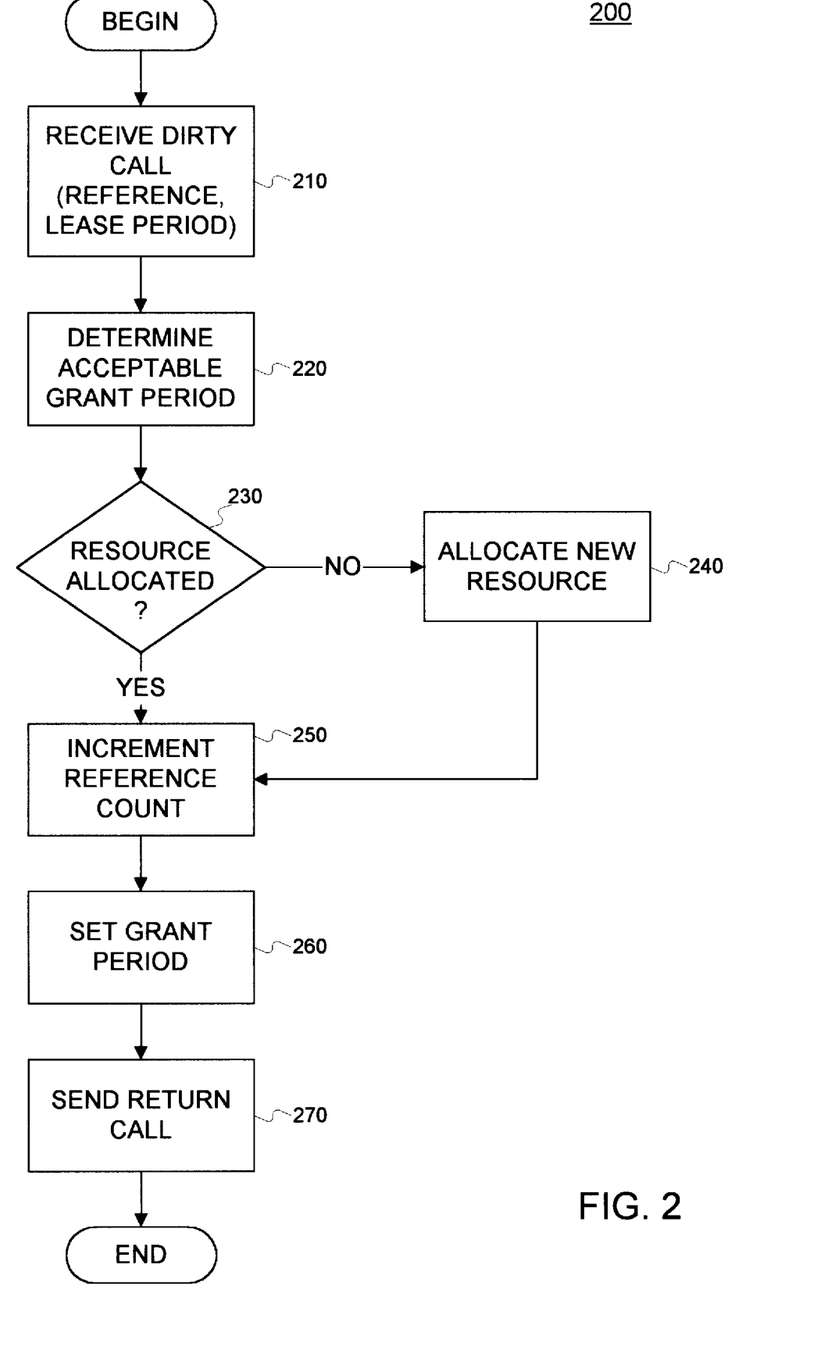
FIG. 2 is a flow diagram of the steps performed by the server call processor to process dirty calls according to the implementation of the present invention.

FIG. 2 is a flow diagram of the procedure 200 that the MI component's server call processor uses to handle requests to reference resources, i.e., dirty calls, that the MI software component manages. These requests come from application call processors of MI components in the distributed processing system, including the application call processor of the same MI component as the server call processor handling requests.

First, the server call processor receives a dirty call (step 210). The server call processor then determines an acceptable grant period (step 220). The grant period may be the same as the requested lease period or some other time period. The server call processor determines the appropriate grant period based on a number of conditions including the amount of resource required and the number of other grant periods previously granted for the same resource.

When the server call processor determines that a resource has not yet been allocated for the reference of a dirty call (step 230), the server call processor allocates the required resource (step 240).

The server call processor then increments a reference count corresponding to the reference of a dirty call (step 250), sets the acceptable grant period for the reference-to-resource binding (step 260), and sends a return call to an application call processor with the grant period (step 270). In this way, the server call processor controls incoming dirty calls regarding references to resources under its control.

Applications can extend leases by sending dirty calls with an extension request before current leases expire. As shown in procedure 200, a request to extend a lease is treated just like an initial request for a lease. An extension simply means that the resource will not be reclaimed for some additional interval of time, unless the reference count goes to zero.

(ii) Clean Calls

Figure 3:
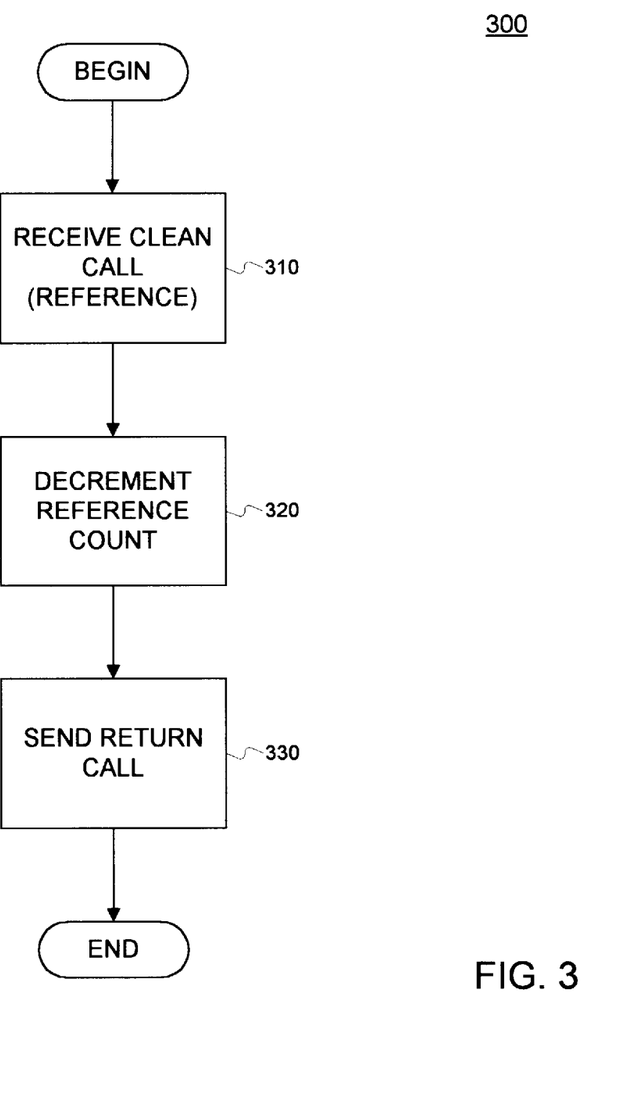
FIG. 3 is a flow diagram of the steps performed by the server call processor to process clean calls according to the implementation of the present invention.

The MI component's server call processor also handles incoming clean calls from application call processors. When an application in the distributed processing system no longer requires a reference to a resource, it informs the MI component managing the resource for that reference so that the resource may be reclaimed for reuse. FIG. 3 is a flow diagram of the procedure 300 with the steps that the MI component's server call processor uses to handle clean calls.

When the server call processor receives a clean call with a reference to a resource that the MI component manages (step 310), the server call processor decrements a corresponding reference count (step 320). The clean call may be sent to the resource, with the server call processor monitoring the resource and executing the procedure 300 to process the call. Subsequently, the server call processor sends a return call to the MI component that sent the clean call to acknowledge receipt (step 330). In accordance with this implementation of the present invention, a clean call to drop a reference may not be refused, but it must be acknowledged.

(iii) Garbage Collection

The server call processor also initiates a garbage collection cycle to reclaim resources for which it determines that either no more references are being made to the resource or that the agreed lease period for the resource has expired. The procedure 400 shown in FIG. 4 includes a flow diagram of the steps that the server call processor uses to initiate a garbage collection cycle.

Figure 4:
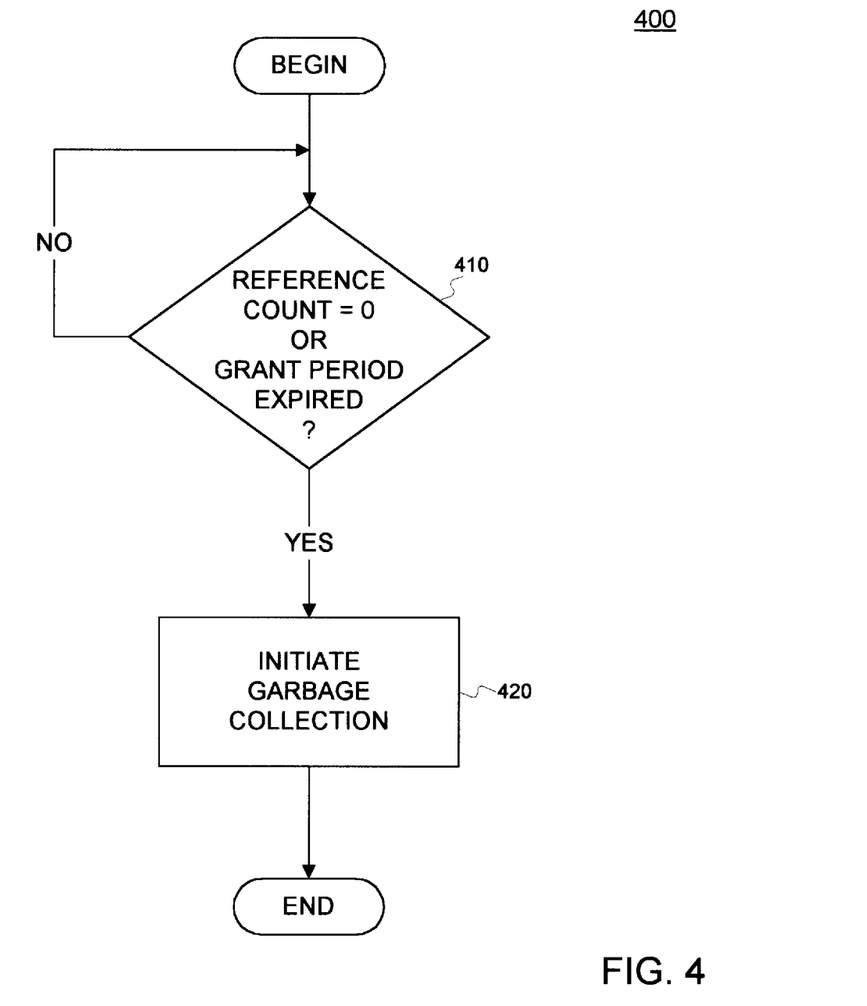
FIG. 4 is a flow diagram of the steps performed by the server call processor to initiate a garbage collection process according to the implementation of the present invention.

The server call processor monitors reference counts and granted lease periods and determines whether a reference count is zero for a resource managed by the MI component, or the grant period for a reference has expired (step 410). When either condition exists, the server call processor initiates garbage collection (step 420) of that resource. Otherwise, the server call processor continues monitoring the reference counts and granted lease periods.

C. Call Flow

Figure 5:
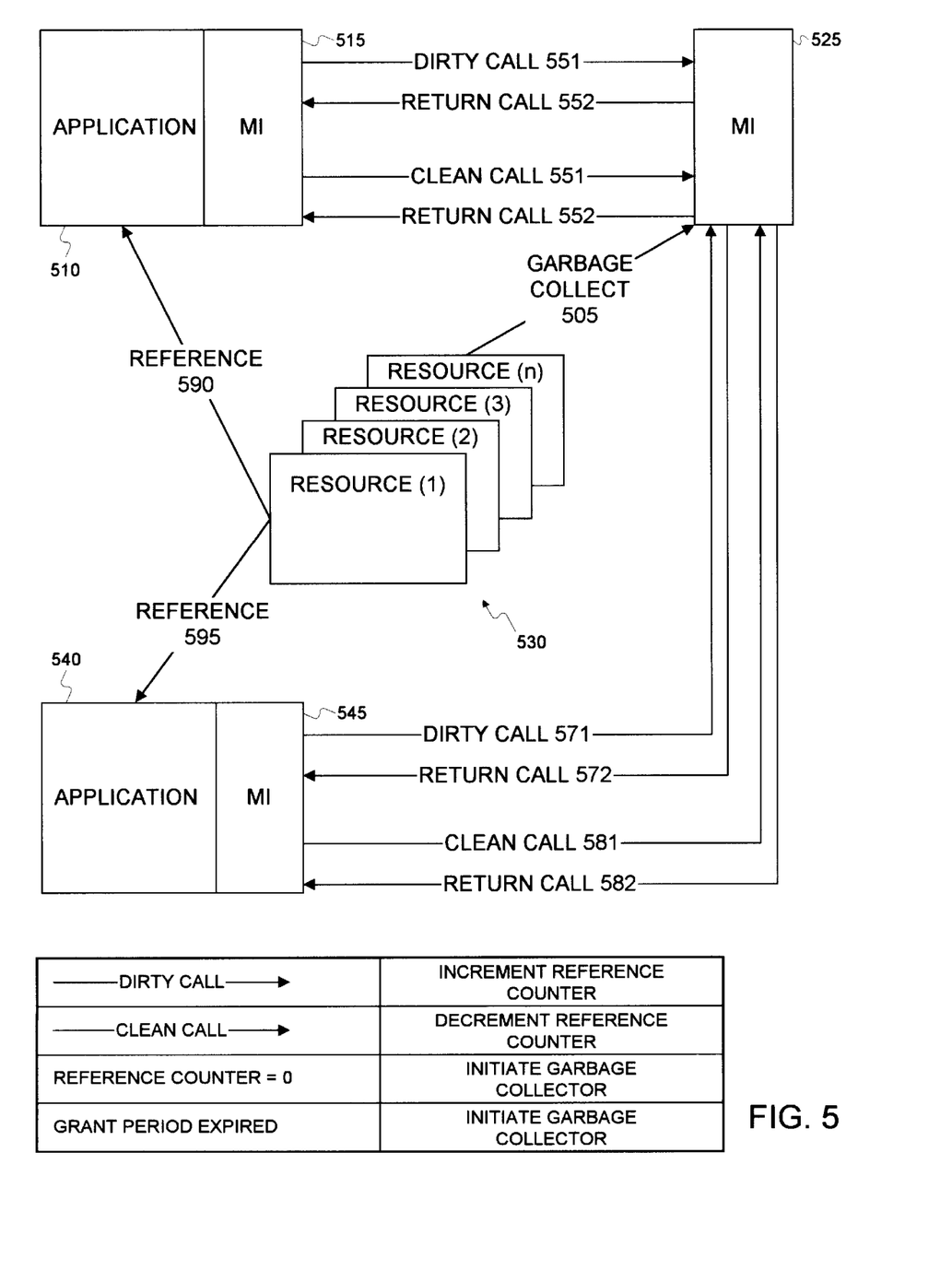
FIG. 5 is a diagram of a preferred flow of calls within a distributed processing system.

FIG. 5 is a diagram illustrating the flow of calls among MI components within the distributed processing system. Managing MI component 525 manages the resources 530 by monitoring the references to those resources 530 (see garbage collect 505). Because the managing MI components 525 manages the resources, the server call processor of managing MI component 525 performs the operations of this call flow description.

FIG. 5 also shows that applications 510 and 540 have corresponding MI components 515 and 545, respectively. Each of the applications 510 and 540 obtains a reference to one of the resources 530 and seeks to obtain access to one of the resources 530 such that a reference is bound to the corresponding resource. To obtain access, applications 510 and 540 invoke their corresponding MI components 515 and 545, respectively, to send dirty calls 551 and 571, respectively, to the MI component 525. Because the MI components 515 and 525 handle application requests for access to resources 530 managed by another MI component, such as managing MI component 525, the application call processors of MI components 515 and 545 perform the operations of this call flow description.

In response to the dirty calls 551 and 571, managing MI component 525 sends return calls 552 and 572, respectively, to each of the MI components 515 and 545, respectively. The dirty calls include granted lease periods for the references of the dirty calls 551 and 571.

Similarly, FIG. 5 also shows MI components 515 and 545 sending clean calls 561 and 581, respectively, to managing MI component 525. Clean calls 561 and 581 inform managing MI component 525 that applications 510 and 540, respectively, no longer require access to the resource specified in the clean calls 561 and 581. Managing MI component 525 responds to clean calls 561 and 581 with return calls 562 and 582, respectively. Return calls 562 and 582 differ from return calls 552 and 572 in that return calls 562 and 582 are simply acknowledgments from MI component 525 of the received clean calls 561 and 581.

Both applications 510 and 540 may request access to the same resource. For example, application 510 may request access to "RESOURCE(1)" while application 540 was previously granted access to that resource. MI component 525 handles this situation by making the resource available to both applications 510 and 540 for agreed lease periods. Thus, MI component 525 will not initiate a garbage collection cycle to reclaim the "RESOURCE(1)" until either applications 510 and 540 have both dropped their references to that resource or the latest agreed periods has expired, whichever event occurs first.

By permitting more than one application to access the same resource simultaneously, the present invention also permits an application to access a resource after it sent a clean call to the managing MI component dropping the reference to the resource. This occurs because the resource is still referenced by another application or the reference's lease has not yet expired so the managing MI component 525 has not yet reclaimed the resource. The resource, however, will be reclaimed after a finite period, either when no more applications have leases or when the last lease expires.

D. MI Components

Figure 6:
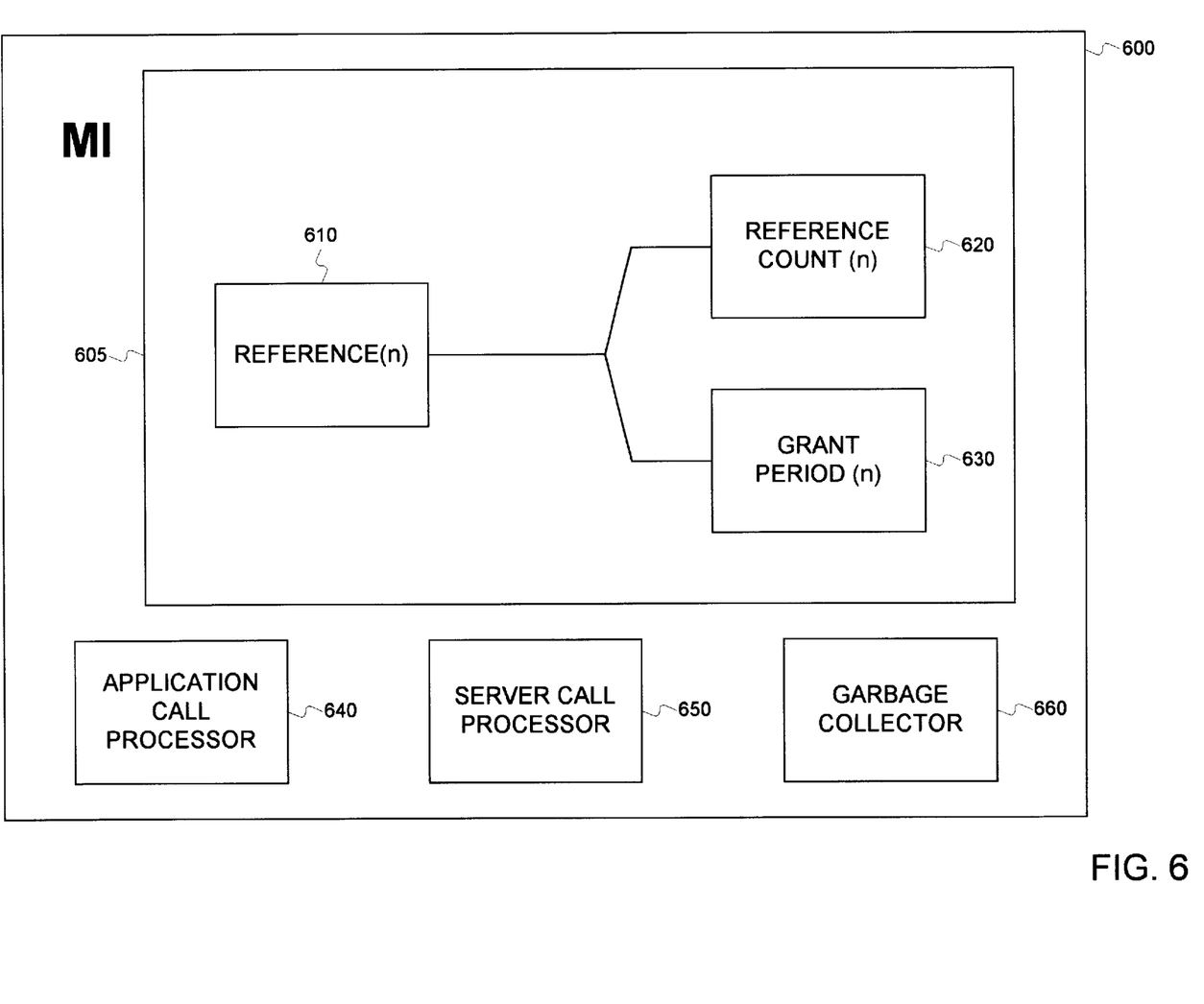
FIG. 6 is a block diagram of the components of the implementation of a method invocation service according to the present invention.

FIG. 6 is a block diagram of the modules of an MI component 600 according to an implementation of the present invention. MI component 600 can include a reference component 605 for each reference monitored, application call processor 640, server call processor 650, and garbage collector 660.

Reference component 605 preferably constitutes a table or comparable structure with reference data portions 610, reference count 620, and grant period register 630. MI component 600 uses the reference count 620 and grant period 630 for each reference specified in a corresponding reference data portion 610 to determine when to initiate garbage collector 660 to reclaim the corresponding resource.

Application call processor 640 is the software module that performs the steps of procedure 100 in FIG. 1. Server call processor 650 is the software module that performs the steps of procedures 200, 300, and 400 in FIGS. 2–4. Garbage collector 660 is the software module that reclaims resources in response to instructions from the server call processor 650, as explained above.

E. Distributed Processing System

Figure 7:
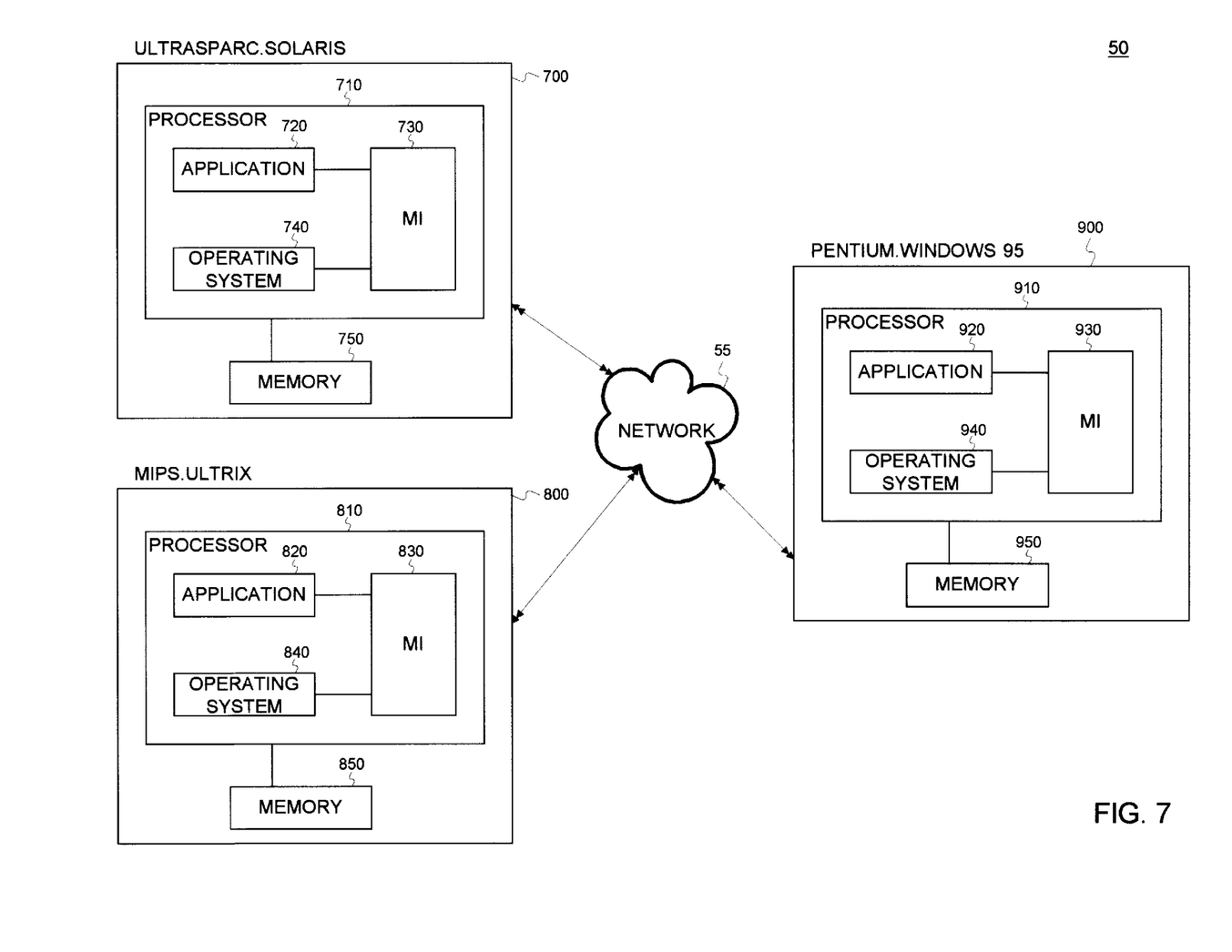
FIG. 7 is a diagram of a distributed processing system that can be used in an implementation of the present invention.

FIG. 7 illustrates a distributed processing system 50 which can be used to implement the present invention. In FIG. 7, distributed processing system 50 contains three independent and heterogeneous platforms 100, 200, and 300 connected in a network configuration represented by the network cloud 55. The composition and protocol of the network configuration represented in FIG. 7 by the cloud 55 is not important as long as it allows for communication of the information between platforms 700, 800 and 900. In addition, the use of just three platforms is merely for illustration and does not limit the present invention to the use of a particular number of platforms. Further, the specific network architecture is not crucial to this invention. For example, another network architecture that could be used in accordance with this invention would employ one platform as a network controller to which all the other platforms would be connected.

In the implementation of distributed processing system 50, platforms 700, 800 and 900 each include a processor 710, 810, and 910 respectively, and a memory, 750, 850, and 950, respectively. Included within each processor 710, 810, and 910, are applications 720, 820, and 920, respectively, operating systems 740, 840, and 940, respectively, and MI components 730, 830, and 930, respectively.

Applications 720, 820, and 920 can be programs that are either previously written and modified to work with the present invention, or that are specially written to take advantage of the services offered by the present invention. Applications 720, 820, and 920 invoke operations to be performed in accordance with this invention.

MI components 730, 830, and 930 correspond to the MI component 600 discussed above with reference to FIG. 6.

Operating systems 740, 840, and 940 are standard operating systems tied to the corresponding processors 710, 810, and 910, respectively. The platforms 700, 800, and 900 can be heterogenous. For example, platform 700 has an UltraSparc® microprocessor manufactured by Sun Microsystems Corp. as processor 710 and uses a Solaris® operating system 740. Platform 800 has a MIPS microprocessor manufactured by Silicon Graphics Corp. as processor 810 and uses a Unix operating system 840. Finally, platform 900 has a Pentium microprocessor manufactured by Intel Corp. as processor 910 and uses a Microsoft Windows 95 operating system 940. The present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 750, 850, and 950 serve several functions, such as general storage for the associated platform. Another function is to store applications 720, 820, and 920, MI components 730, 830, and 930, and operating systems 740, 840, and 940 before execution by the respective processor 710, 810, and 910. In addition, portions of memories 750, 850, and 950 may constitute shared memory available to all of the platforms 700, 800, and 900 in network 50.

E. MI Services

The present invention may be implemented using a client/server model. The client generates requests, such as the dirty calls and clean calls, and the server responds to requests.

Figure 8:
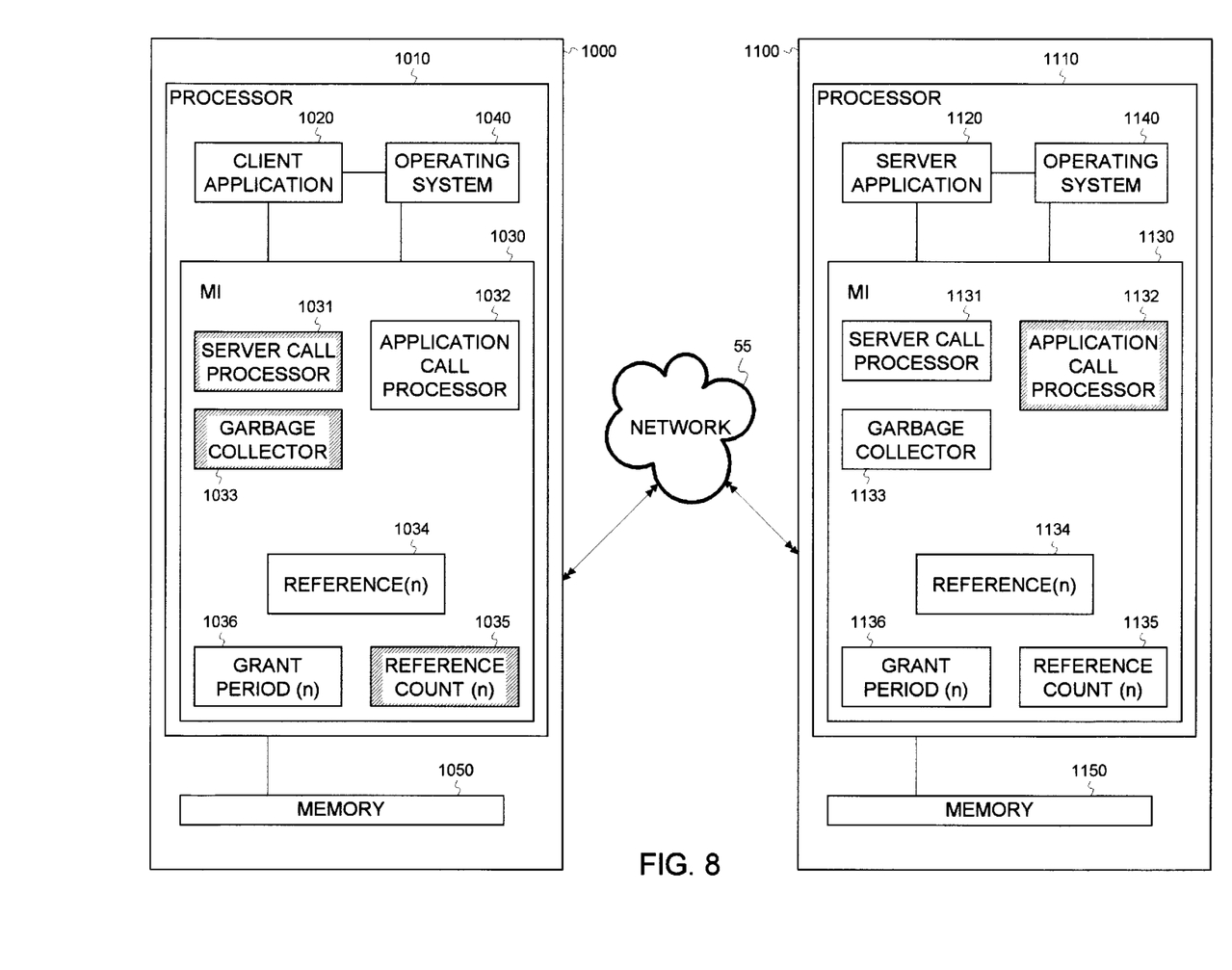
FIG. 8 is a diagram of the individual software components in the platforms of the distributed processing system according to the implementation of the present invention.

Each of the MI components 730, 830 and 930 shown in FIG. 7 preferably includes both client components and server components. FIG. 8, which is a block diagram of a client platform 1000 and a server platform 1100, applies to any two of the platforms 700, 800, and 900 in FIG. 7.

Platforms 1000 and 1100 contain memories 1050 and 1150, respectively, and processors 1010 and 1110, respectively. The elements in the platforms 1000 and 1100 function in the same manner as similar elements described above with reference to FIG. 7. In this example, processor 1010 executes a client application 1020 and processor 1110 executes a server application 1120. Processors 1010 and 1110 also execute operating systems 1040 and 1140, respectively, and MI components 1030 and 1130, respectively.

MI components 1030 and 1130 each include a server call processor 1031 and 1131, respectively, an application call processor 1032 and 1132, respectively, and a garbage collector 1033 and 1133, respectively. Each of the MI components 1030 and 1130 also contains reference components, including reference data portions 1034 and 1134, respectively, reference counts 1035 and 1135, respectively, and grant period registers 1036 and 1136, respectively, for each reference that the respective MI component 1030 or 1 130 monitors.

Application call processors 1032 and 1132 represent the client service and communicate with server call processors 1031 and 1131, respectively, which represent the server service. Because platforms 1000 and 1100 contain a server call processor, an application call processor, a garbage collector, and reference components, either platform can act as a client or a server.

For purposes of the discussion that follows, however, platform 1000 is designated the client platform and platform 1100 is designated as the server platform. In this example, client application 1020 obtains references to distributed resources and uses MI component 1030 to send dirty calls to the resources managed by MI component 1130 of server platform 1100.

Additionally, server platform 1100 may be executing a server application 1120. Server application 1120 may also use MI component 1130 to send dirty calls, which may be handled by MI component 1130 when the resources of those dirty calls are managed by MI component 1130. Alternatively, server application 1120 may use MI component 1130 to send dirty calls to resources managed by MI component 1030.

Accordingly, server call processor 1031, garbage collector 1033, and reference count 1035 for MI component 1030 of client platform 1000 are not active and are therefore presented in FIG. 8 as shaded. Likewise, application call processor 1132 of MI component 1130 of the server platform 1100 is shaded because it is also dormant.

When client application 1020 obtains a reference corresponding to a resource, application call processor 1032 sends a dirty call, which server call processor 1131 receives. The dirty call includes a requested lease period. Server call processor 1131 increments the reference count 1135 for the reference in the dirty call and determines a grant period. In response, server call processor 1131 sends a return call to application call processor 1030 with the grant period. Application call processor 1032 uses the grant period to update recorded grant period 1035, and to determine when the resource corresponding to the reference of its dirty call may be reclaimed.

Server call processor 1131 also monitors the reference counts and grant periods corresponding to references for resources that it manages. When one of its reference counts 1135 is zero, or when the grant period 1135 for a reference has expired, whichever event occurs first, server call processor 1131 may initiate the garbage collector 1133 to reclaim the resource corresponding to the reference that has a reference count of zero or an expired grant period.

The leased-reference scheme according to the implementation of the present invention does not require that the clocks on the platforms 1000 and 1100 involved in the protocol be synchronized. The scheme merely requires that they have comparable periods of increase. Leases do not expire at a particular time, but rather expire after a specific time interval. As long as there is approximate agreement on the interval, platforms 1000 and 1100 will have approximate agreement on the granted lease period. Further, since the timing for the lease is, in computer terms, fairly long, minor differences in clock rate will have little or no effect.

The transmission time of the dirty call can affect the protocol. If MI component 1030 holds a lease to reference and waits until just before the lease expires to request a renewal, the lease may expire before the MI component 1130 receives the request. If so, MI component 1130 may reclaim the resource before receiving the renewal request. Thus, when sending dirty calls, the sender should add a time factor to the requested lease period in consideration of transmission time to the platform handling the resource of a dirty call so that renewal dirty calls may be made before the lease period for the resource expires.

F. Conclusion

In accordance with the present invention a distributed garbage collection scheme ensures referential integrity and eliminates memory leaks by providing granted lease periods corresponding to references to resources in the distributed processing system such that when the granted lease periods expire, so do the references to the resources. The resources may then be collected. Resources may also be collected when they are no longer being referenced by processes in the distributed processing system with reference to counters assigned to the references for the resources.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A method for managing resources comprising the steps of:
   receiving a request from a process referring to a resource and specifying a requested lease period;
   permitting shared access to the resource for a granted lease period;
   advising the process of the granted lease period; and
   deallocating the resource when the granted lease period expires.

2. The method of claim 1, wherein the permitting step includes the substep of:
   determining the granted lease period to be a period less than the requested lease period.

3. The method of claim 1, wherein the permitting step includes the substep of:
   determining the granted lease period based on at least one of the requested lease period, a measure of the resource, and other granted lease periods for the resource.

4. The method of claim 1, wherein the permitting step includes the substep of:
   allocating the resource upon a determination that it was not previously allocated.

5. The method of claim 1, wherein the permitting step includes the substep of:
   incrementing a reference count corresponding to the resource, the reference count indicating how many processes currently have references to the resource.

6. The method of claim 5, further comprising the step of:
   receiving a second request from the process indicating that the process wishes to terminate its access to an identified resource; and
   decrementing the reference count corresponding to the identified resource.

7. The method of claim 6, wherein the deallocating step includes the substep of:
   invoking a garbage collection process to deallocate the identified resource when the reference count indicates no processes currently access the identified resource.

8. The method of claim 1, wherein the deallocating step includes the substep of:
   invoking a garbage collection process to reclaim the resource when shared access to the resource is no longer requested.

9. A method for managing resources comprising the steps of:
   requesting from a process access to a resource for a lease period;
   receiving from the process a granted lease period during which shared access to the resource is permitted; and
   sending a request to the process for a new lease period upon a determination that the granted lease period is about to expire but access to the resource has not completed.

10. The method of claim 9, further comprising the step of:
    prior to expiration of the granted lease period, sending a different request indicating that shared access to the resource is no longer requested.

11. An apparatus comprising:
    a receiving module configured to receive a request from a process referring to a resource and specifying a requested lease period;
    a resource allocator configured to permit shared access to the resource for a granted lease period;
    an advising module configured to advise the process of the granted lease period; and
    a resource deallocator configured to deallocate the resource when the granted lease period expires.

12. The apparatus of claim 11, wherein the resource allocator includes:
    a determining module configured to determine the granted lease period to be a period less than the requested lease period.

13. The apparatus of claim 11, wherein the resource allocator includes:
    a determining module configured to determine the granted lease period based on at least one of the requested lease period, a measure of the resource, and other granted lease periods for the resource.

14. The apparatus of claim 11, wherein the resource allocator includes:
    an allocating module configured to allocate the resource upon a determination that it was not previously allocated.

15. The apparatus of claim 11, wherein the resource allocator includes:
    an incrementing module configured to increment a reference count corresponding to the resource, the reference count indicating how many processes currently have references to the resource.

16. The apparatus of claim 15, further comprising:
    a second receiving module configured to receive a second request from the process indicating that the process wishes to terminate its access to an identified resource; and
    a decrementing module configured to decrement the reference count corresponding to the identified resource.

17. The apparatus of claim 16, wherein the resource deallocator includes:
an invoker configured to invoke a garbage collection process to deallocate the identified resource when the reference count indicates no processes currently access to the identified resource.

18. The apparatus of claim 11, wherein the resource deallocator includes:
an invoker configured to invoke a garbage collection process to reclaim the resource when shared access to the resource is no longer requested.

19. An apparatus comprising:
a requesting module configured to request from a process access to a resource for a lease period;
a receiving module configured to receive from the process a granted lease period during which shared access to the resource is permitted; and
a second sending module configured to send another request to the process for a new lease period upon a determination that the granted lease period is about to expire but access to the resource has not completed.

20. The apparatus of claim 19, further comprising:
a second sending module configured to send a different request indicating that shared access to the resource is no longer requested prior to expiration of the granted lease period.

21. A computer program product comprising:
a computer usable medium having computer readable code embodied therein for managing resources, the computer usable medium comprising:
a receiving module configured to receive a request from a process referring to a resource and specifying a requested lease period;
a resource allocator configured to permit shared access to the resource for a granted lease period;
an advising module configured to advise of the granted lease period; and
a resource deallocator configured to deallocate the resource when the granted lease period expires.

22. The computer program product of claim 21, wherein the resource allocator includes:
a determining module configured to determine the granted lease period to be a period less than the requested lease period.

23. The computer program product of claim 21, wherein the resource allocator includes:
a determining module configured to determine the granted lease period based on at least one of the requested lease period, a measure of the resource, and other granted lease periods for the resource.

24. The computer program product of claim 21, wherein the resource allocator includes:
an allocating module configured to allocate the resource upon a determination that it was not previously allocated.

25. The computer program product of claim 21, wherein the resource allocator includes:
a reference count module configured to indicate a number of processes that currently have references to the resource.

26. The computer program product of claim 25, the computer usable medium further comprising:
a second receiving module configured to receive a second request from the process indicating that the process wishes to terminate its access to an identified resource; and
a decrementing module configured to decrement the reference count corresponding to the identified resource.

27. The computer program product of claim 26, wherein the resource deallocator includes:
an invoker configured to invoke a garbage collection process to deallocate the identified resource when the reference count indicates no processes currently access the identified resource.

28. The computer program product of claim 21, wherein the resource deallocator includes:
an invoker configured to invoke a garbage collection process to reclaim the resource when shared access to the resource is no longer requested.

29. A computer program product comprising:
a computer usable medium having computer readable code embodied therein for managing resources, the computer usable medium comprising:
a requesting module configured to request from a process access to a resource for a lease period;
a receiving module configured to receive from the process a granted lease period during which the process permits shared access to the resource; and
a sending module configured to send another request to the process for a new lease period upon a determination that the granted lease period is about to expire.

30. The computer program product of claim 29, the computer usable medium further comprising:
a second sending module configured to send a different request indicating that shared access to the resource is no longer requested prior to expiration of the granted lease period.

31. A computer system comprising:
a computer processor;
a memory which is operatively coupled to the computer processor; and
a computer process which executes in the computer processor for the memory and which includes:
a receiving module configured to receive a request from a process referring to a resource and specifying a requested lease period;
a resource allocator configured to permit shared access to the resource for a granted lease period;
an advising module configured to advise of the granted lease period; and
a resource deallocator configured to deallocate the resource when the granted lease period expires.

32. The computer system of claim 31, wherein the resource allocator includes:
a determining module configured to determine the granted lease period to be a period less than the requested lease period.

33. The computer system of claim 31, wherein the resource allocator includes:
a determining module configured to determine the granted lease period based on at least one of the requested lease period, a measure of the resource, and other granted lease periods for the resource.

34. The computer system of claim 31, wherein the resource allocator includes:
an allocating module configured to allocate the resource upon a determination that it was not previously allocated.

35. The computer system of claim 31, wherein the resource allocator includes:
a reference count module configured to indicate a number of processes that currently have references to the resource.

36. The computer system of claim 35, wherein the computer process further includes:
  a second receiving module configured to receive a second request from the process indicating that the process wishes to terminate its access to an identified resource; and
  a decrementing module configured to decrement the reference count corresponding to the identified resource.

37. The computer system of claim 36, wherein the resource deallocator includes:
  an invoker configured to invoke a garbage collection process to deallocate the identified resource when the reference count indicates no processes currently access the identified resource.

38. The computer system of claim 31, wherein the resource deallocator includes:
  an invoker configured to invoke a garbage collection process to reclaim the resource when shared access to the resource is no longer requested.

39. The method of claim 31, further comprising the steps of;
  (e) receiving new requests from the requestor platforms including references to the system resources and indicating that the requestor platforms request to terminate access to the system resources of the new requests; and
  (f) decrementing the reference counter corresponding to each of the referenced system resources specified in the new requests.

40. A computer system comprising:
  a computer processor;
  a memory which is operatively coupled to the computer processor; and
  a computer process which executes in the computer processor for the memory and which includes:
    a requesting module configured to request from a process access to a resource for a lease period;
    a receiving module configured to receive from the process a granted lease period during which the process permits shared access to the resource; and
    a sending module configured to send another request to the process for a new lease period upon a determination that the granted lease period is about to expire.

41. The computer system of claim 40, wherein the computer process further includes:
  a second sending module configured to send a different request indicating that shared access to the resource is no longer requested prior to expiration of the granted lease period.

42. In a distributed processing system having a plurality of platforms, a method for allocating and deallocating resources distributed among the platforms comprising the steps, performed by server platforms, of:
  (a) receiving requests from requestor platforms including references to system resources and requested lease periods, the requests indicating that the corresponding requestor platform seeks access to the referenced system resource for the requested period of time in the request;
  (b) allocating each of the referenced system resources by
    (i) setting a corresponding grant period in response to each of the requested lease periods, the grant period indicating an interval for which each of the referenced system resources associated with requests will be available for access by the platforms, and
    (ii) incrementing a corresponding reference counter, the reference counter indicating a number of the platforms accessing the corresponding system resource as determined by the receipt of requests;
  (c) sending responses to the requestor platforms, in response to associated requests, specifying the grant periods for the resources referenced in the associated requests;
  (d) initiating a garbage collection process to deallocate each of the referenced system resources when
    (i) the grant period for each referenced system resource expires, or
    (ii) the corresponding reference counter is a state indicating that no requestor platforms currently seek access to each of the referenced system resources.

43. A method for managing resources comprising the steps of:
  receiving a request for a resource and specifying a requested lease period;
  permitting access to the resource for a granted lease period based on the requested lease period; and
  releasing the resource when the granted lease period expires.

44. The method of claim 43, wherein the permitting step includes the substep of
  determining the granted lease period to be a period less than the requested lease period.

45. The method of claim 43, wherein the permitting step includes the substep of
  determining the granted lease period based on at least one of the requested lease period, a measure of the resource, and other granted lease periods for the resource.

46. The method of claim 43, wherein the permitting step includes the substep of
  designating the resource upon a determination that access to the resource was not previously permitted.

47. The method of claim 43, wherein the permitting step includes the substep of
  incrementing a reference count corresponding to the resource, the reference count indicating a number of processes currently having access to the resource.

48. The method of claim 47, further comprising the steps of
  receiving a second request to terminate access to an identified resource; and
  decrementing the reference count corresponding to the identified resource.

49. The method of claim 47, wherein the releasing step includes the substep of
  invoking a garbage collection process to reclaim the resource when the reference count indicates no processes currently access the identified resource.

50. The method of claim 43, wherein the releasing step includes the substep of
  invoking a garbage collection process to reclaim the resource when access to the resource is no longer requested.

51. The method of claim 43, wherein the permitting step includes the substep of
  guaranteeing integrity of the resource for the granted lease period.

52. An apparatus for managing resources comprising:
  a receiving component configured to receive a request for a resource and specifying a requested lease period;
  an accessing component configured to permit access to the resource for a granted lease period based on the requested lease period; and a releasing component configured to release the resource when the granted lease period expires.

53. The apparatus of claim 52, wherein the accessing component includes:

a determining component configured to determine the granted lease period to be a period less than the requested lease period.

54. The apparatus of claim 52, wherein the accessing component includes:

a determining component configured to determine the granted lease period based on at least one of the requested lease period, a measure of the resource, and other granted lease periods for the resource.

55. The apparatus of claim 52, wherein the accessing component includes:

a designating component configured to designate the resource upon a determination that access to the resource was not previously permitted.

56. The apparatus of claim 52, wherein the accessing component includes:

an incrementing component configured to increment a reference count corresponding to the resource, the reference count indicating a number of processes currently having access to the resource.

57. The apparatus of claim 56, further comprising:

a receiving component configured to receive a second request to terminate access to an identified resource; and a decrementing component configured to decrement the reference count corresponding to the identified resource.

58. The apparatus of claim 56, wherein the releasing component includes:

a component configured to invoke a garbage collection process to reclaim the resource when the reference count indicates no processes currently access the identified resource.

59. The apparatus of claim 52, wherein the releasing component includes:

a component configured to invoke a garbage collection process to reclaim the resource when access to the resource is no longer requested.

60. The apparatus of claim 52, wherein the accessing component includes:

a component configured to guarantee integrity of the resource for the granted lease period.

61. A computer program product comprising a computer usable medium having computer readable code embodied therein for managing resources, comprising:

a receiving module configured to receive a request for a resource and specifying a requested lease period;

an accessing module configured to permit access to the resource for a granted lease period based on the requested lease period; and a releasing module configured to release the resource when the granted lease period expires.

62. The computer program product of claim 61, wherein the accessing module includes:

a determining module configured to determine the granted lease period to be a period less than the requested lease period.

63. The computer program product of claim 61, wherein the accessing module includes:

a determining module configured to determine the granted lease period based on at least one of the requested lease period, a measure of the resource, and other granted lease periods for the resource.

64. The computer program product of claim 61, wherein the accessing module includes:

a designating module configured to designate the resource upon a determination that access to the resource was not previously permitted.

65. The computer program product of claim 61, wherein the accessing module includes:

an incrementing module configured to increment a reference count corresponding to the resource, the reference count indicating a number of processes currently having access to the resource.

66. The computer program product of claim 65, further comprising:

a receiving module configured to receive a second request to terminate access to an identified resource; and a decrementing module configured to decrement the reference count corresponding to the identified resource.

67. The computer program product of claim 65, wherein the releasing module includes:

a module configured to invoke a garbage collection process to reclaim the resource when the reference count indicates no processes currently access the identified resource.

68. The computer program product of claim 61, wherein the releasing module includes:

a module configured to invoke a garbage collection process to reclaim the resource when access to the resource is no longer requested.

69. The computer program product of claim 61, wherein the accessing module includes:

a module configured to guarantee integrity of the resource for the granted lease period.

70. A computer system comprising:

a computer processor;

a memory which is operatively coupled to the computer processor; and a computer process which executes in the computer processor for the memory and which includes:
a receiving module configured to receive a request for a resource and specifying a requested lease period;
an accessing module configured to permit access to the resource for a granted lease period based on the requested lease period; and
a releasing module configured to release the resource when the granted lease period expires.

* * * * *

UNITED STATES PATENT AND TRADEMARK OFFICE
CERTIFICATE OF CORRECTION

PATENT NO.: 5,832,529

DATED: November 3, 1998

INVENTOR(S): Ann M. WOLLRATH, et al.

It is certified that an error appears in the above-identified patent and that said Letters Patent is hereby corrected as shown below:

Renumber claims 39 to 40, 40 to 41, 41 to 42, 42 to 39;

new claim 40, change "claim 31" to claim --39--;

new claim 42, change "claim 40" to --claim 41--.

Signed and Sealed this

Eleventh Day of April, 2000

Attest:

Q. TODD DICKINSON

Attesting Officer

Director of Patents and Trademarks